Aug. 30, 1927.

A. A. JOHNSON

PHONOGRAPH RECORD

Filed Jan. 3, 1924

1,641,142

INVENTOR

Patented Aug. 30, 1927.

1,641,142

UNITED STATES PATENT OFFICE.

ARTHUR A. JOHNSON, OF BRIDGEPORT, CONNECTICUT, ASSIGNOR TO DICTAPHONE CORPORATION, OF BRIDGEPORT, CONNECTICUT, A CORPORATION OF NEW YORK.

PHONOGRAPH RECORD.

Application filed January 3, 1924. Serial No. 684,166.

This invention relates to sound-records and in the embodiment herein illustrated it is applied to sound-record tablets used in conjunction with dictating and allied machines.

An object of this invention is to provide a record tablet having a suitable reinforcement to take-up some of the strain incidental to the operation of removing the tablet from the machine and to contraction and expansion of the tablet due to temperature changes.

Another object is to provide a suitable form of reinforcement which will not interfere with the ordinary processes of manufacture of sound-records, or require substantial changes of the form, size or composition of the records.

A further object is to provide a suitable reinforcement which will allow the waxy material to flow through it and form a homogeneous mass through the reinforcement and at both sides of it, causing the reinforcement to be embedded in the surface of the record-tablet instead of merely lying upon its surface.

And a still further object is to provide a cylindrical record-tablet having a helically fluted inside surface and having a cloth or other suitable reinforcement located at the bottoms of the flutes.

Other objects and advantages will hereinafter appear.

Figure 1:
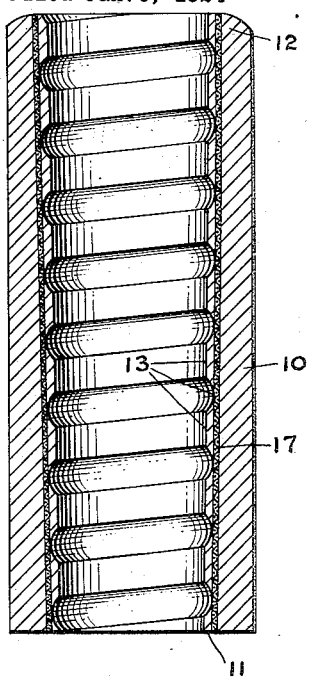
Figure 1 is a section of a cylindrical record-tablet made in accordance with this invention.

As shown in the accompanying drawings, the sound-record tablet 10 is in the form of a hollow cylinder upon the periphery of which the sound record is made by a suitable knife-like recording stylus to be later reproduced by a suitable reproducing stylus. During these operations, the record-tablet is usually supported upon a mandrel having spring-pressed plungers or other suitable friction devices for firmly engaging the record-tablet and holding it for rotation and against lateral displacement.

The mandrel upon which the record-tablet is placed is tapered, and, consequently, the internal surface of the record correspondingly tapers from the small end 11 to the large end 12. The taper is provided among other reasons, to enable the tablet to be easily withdrawn from the core when being made and to allow the tablet to be easily applied to and removed from the mandrel. In order to increase the grip of the mandrel upon the tablet, its inside surface is fluted, having helical ribs and groove 13. These ribs and grooves 13 are produced in the manufacture of the tablet by a fluted core 14 (see Fig. 2) mounted on a suitable base 15 which also holds the shell 16 of the mold for shaping the record-tablet. The upper end of the shell 16 is open and the molten wax-like material is poured into the shell through this opening. After the waxy material has sufficiently congealed, the shell 16 is stripped from the record-tablet by suitable means, and then the core 14 is removed by rotating it while the tablet is held. In this operation, the helical flutes of the core act as screw-threads in facilitating the withdrawal of the core from the record-tablet and make it a very easy operation.

After the record is removed from the core, and is seasoned, it is reamed to remove the top portions of the lands between the roots of the helical flutes as shown in Fig. 1 so as to increase the contact surface of the record-tablet with the supporting mandrel and to make it accurately fit the same.

From the above, it will be understood that it is extremely important to retain the helical ribs and grooves 13 on the inside surface of the tablet, and that any improvement or change which necessitates the abandonment of the ribs and grooves 13 will be accompanied by serious diadvantages. Consequently, in providing the reinforcement, an object of this invention is to provide for making a tablet so that both the reinforcement and the helical ribs and grooves could be used. However, in attempting to do this, it was found that ordinary cloth or other like material would be pressed against the core 14 so completely by the molten waxy material that it would lie entirely upon the inside surface of the tablet conforming to the shape of the core by following the surface of the lands and flutes throughout the full length of the core. Of course, this was extremely disadvantageous, because in the reaming operation the cloth would be cut-away at the lands of the helical ribs and grooves 13 leaving only a helical strip of cloth in the flutes; also because a sufficient quantity of the waxy record material could not penetrate the reinforement to securely unite the reinforcement to the body of the record tablet; and further because the reinforcing element itself would engage the mandrel, whereas it is desired that the record material, which is relatively soft and somewhat pliable, do this.

To avoid these difficulties, this invention provides a stiff, open-mesh textile fabric 17, such as crinoline, for example. When this is well sized, it is found to be sufficiently stiff to resist the pressure of the molten waxy material and to permit it to flow through the cloth into the flutes of the core when the tablet is being molded. The cloth 17 being self-sustaining in any position, remains upon the lands of the core 14 and thus is disposed along the bottom or root of the helical groove near the inside surface of the molded tablet.

Figure 3:
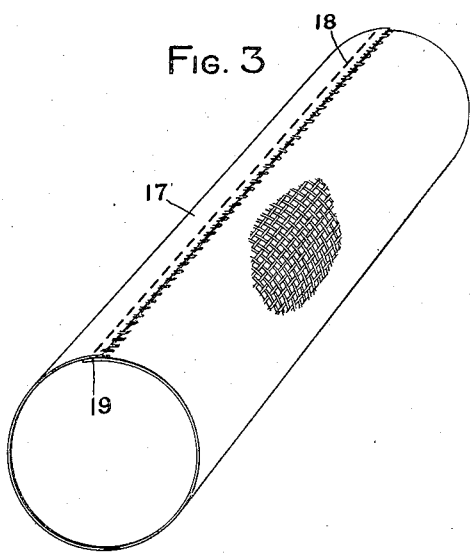
Fig. 3 is a perspective of one form of reinforcing element made in accordance with this invention.

In practice, the cloth 17 is cut to shape and made in the form of a tapering tube, as shown in Fig. 3, so as to slip over the core to be held, by its own frictional engagement with the core, a short distance from both ends of the core. When the cloth reinforcement is made of sheet-material, its ends may be joined by a row of stitches 18. Or, the adjoining edges of the cloth may be cemented together by a coating of silicate of soda (water-glass), ordinary glue, paraffin, egg or blood albumen, or other suitable binders or adhesives. It has been found that silicate of soda is probably the most satisfactory, considering the relative cost, for it is easily applied and holds well under all working temperatures of the waxy record material.

Figure 2:
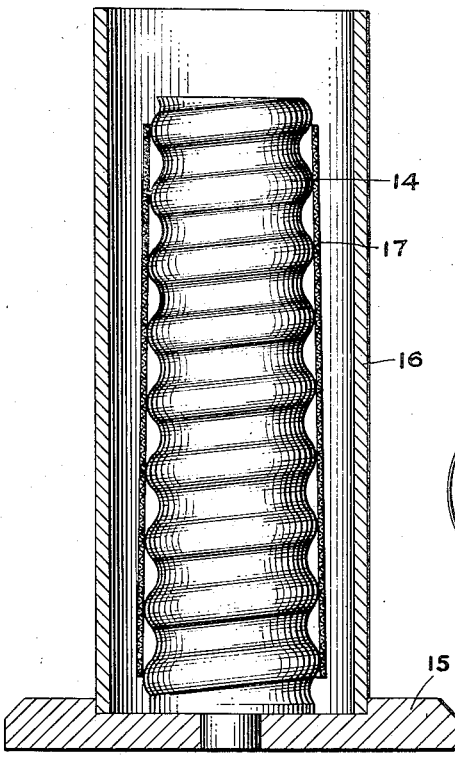
Fig. 2 is a sectional view of the mold used in making the record-tablet, and showing a cloth reinforcement located on the core of the mold.

After the lining or reinforcement 17 has been made it is slipped upon the core 14 as shown in Fig. 2 and the molten waxy material of which the tablet is composed is poured into the mold in the usual manner. When the tablet cools, after having been stripped from the shell and core, as above described, it can contract unrestrictedly and in proportion to its varying thicknesses at different places along its length caused by the helical fluting and the taper. Consequently, there is no internal strain produced in the cooling operation so long as the core is removed before the record material is allowed to set.

When the reinforced record tablet of this invention is reamed, only the tops of the lands of waxy material are removed but the cloth 17 is not reached by the cutter, because the cloth 17 is completely embedded in the tablet 10 at the points corresponding to the bottom or root of the helical groove in the tablet. In a tablet made in accordance with this invention, there is a sufficient quantity of material upon the inner side of the reinforcement to cause it to be securely united to the main body portion of the tablet; and, thus, chipping or scaling-off of these parts is prevented.

It should be clearly understood that this invention is not limited to the use of crinoline or like textile fabrics, but that other open-mesh material, such as wire-cloth or screening, or even expanded metal or perforated metal sheets may be used within the scope of this invention, so long as the material is relatively stiff and allows the record material to pass through it.

Again, while there are certain decided advantages, above pointed out, in the use in combination of the reinforcement of stiff, open-mesh material and the helical fluting of the record, it should be understood that this invention is not limited to the use of such a reinforcement with that particular kind of record formation, but that the stiff open-mesh reinforcing element may advantageously be used, because of its self-sustaining qualities, with any desired record formation whether it be smooth or irregular on its surface adjacent which the reinforcement is to be located.

Other variations and modifications may be made and portions of the improvements may be used without others within the scope of the appended claims.

Having now described the invention, what is claimed as new and for which it is desired to obtain Letters Patent, is:

1. A cylindrical sound-record tablet having a central bore provided with a helical groove, and having a reinforcing strip of open-mesh fibrous cloth embedded therein and located at the part of the tablet circumscribed by the root of said helical groove.

2. A cylindrical sound-record tablet having a tapering, fluted bore, and a sized fabric embedded therein adjacent the bottoms of the flutes.

3. A cylindrical sound-record tablet having a tapering bore and a reinforcing strip of sized fabric located adjacent the bore.

4. A molded cylindrical sound-record tablet having a tapering bore and having adjacent but spaced from its inside surface a reinforcing strip of foraminous fabric, the foramina of the fabric being of such size as to permit molten record material to freely flow through them when the record is being molded.

5. A sound-record tablet having a strip of reinforcing sized fabric embedded therein.

6. A sound-record having a working surface and a supporting surface and a strip of stiff reinforcing fibrous cloth located between the working surface and the supporting surface.

7. A molded sound record formed of a wax-like record material and having an internally fluted surface, the lands of the flutes being flat to have substantial engagement with a record support, and a reinforcing foraminous cloth embedded in said record material and lying adjacent the root of the flute, said cloth being stiff and open mesh so as to withstand the pressure of the molten record material against it without deforming, and permit the molten record material to flow through the foramina of the cloth in the molding operation.

Signed at Bridgeport, in the county of Fairfield, and State of Connecticut, this 2nd day of January, 1924.

ARTHUR A. JOHNSON.